(12) United States Patent
Hieda et al.

(10) Patent No.: US 7,740,961 B2
(45) Date of Patent: Jun. 22, 2010

(54) MAGNETIC RECORDING MEDIUM

(75) Inventors: Hiroyuki Hieda, Yokohama (JP); Naoko Kihara, Matsudo (JP); Yoshitaka Yanagita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 998 days.

(21) Appl. No.: 11/434,519

(22) Filed: May 16, 2006

(65) Prior Publication Data

US 2006/0257694 A1 Nov. 16, 2006

(30) Foreign Application Priority Data

May 16, 2005 (JP) ............... 2005-142699

(51) Int. Cl.
*G11B 5/66* (2006.01)
(52) U.S. Cl. .................................... 428/833
(58) Field of Classification Search ........................ None
See application file for complete search history.

(56) References Cited

U.S. PATENT DOCUMENTS

| | | | |
|---|---|---|---|
| 5,773,124 A | 6/1998 | Ishikawa et al. | |
| 5,956,216 A | 9/1999 | Chou | |
| 6,171,676 B1 | 1/2001 | Mukai et al. | |
| 6,433,944 B1 | 8/2002 | Nagao et al. | |
| 6,595,506 B1 | 7/2003 | Zide et al. | |
| 6,977,108 B2 | 12/2005 | Hieda et al. | |
| 7,223,439 B2* | 5/2007 | Suwa et al. | 427/127 |
| 7,323,258 B2 | 1/2008 | Kamata et al. | |
| 2003/0190476 A1 | 10/2003 | Veerasamy et al. | |
| 2004/0091748 A1 | 5/2004 | Kamata et al. | |
| 2004/0131890 A1 | 7/2004 | Kikitsu et al. | |
| 2004/0191577 A1 | 9/2004 | Suwa et al. | |
| 2005/0069732 A1 | 3/2005 | Kamata et al. | |
| 2006/0021966 A1 | 2/2006 | Hattori et al. | |
| 2006/0078681 A1 | 4/2006 | Hieda et al. | |
| 2006/0257694 A1 | 11/2006 | Hieda et al. | |
| 2006/0269795 A1 | 11/2006 | Yanagita et al. | |
| 2007/0065683 A1 | 3/2007 | Sonoda et al. | |
| 2007/0275270 A1* | 11/2007 | Hattori et al. | 428/833 |

FOREIGN PATENT DOCUMENTS

| | | |
|---|---|---|
| JP | 60-263330 | 12/1988 |
| JP | 3-238620 | 10/1991 |
| JP | 4-168622 | 6/1992 |
| JP | 04-274001 | 9/1992 |

(Continued)

OTHER PUBLICATIONS

Chou et al., "Single-domain magnetic pillar array of 35 nm diameter and 65 Gbits/in.$^2$ density for ultrahigh density quantum magnetic storage", Journal of Applied Physics, vol. 76, No. 10, Nov. 15, 1994, pp. 6673-6675.

(Continued)

*Primary Examiner*—Holly Rickman
(74) *Attorney, Agent, or Firm*—Nixon & Vanderhye, PC

(57) ABSTRACT

A magnetic recording media has recording cells formed of two-dimensionally arrayed magnetic material, a nonmagnetic layer surrounding the recording cells, an adhesive film formed on each of the recording cells, and a lubricant directly adhered to the adhesive film.

6 Claims, 4 Drawing Sheets

FOREIGN PATENT DOCUMENTS

| | | |
|---|---|---|
| JP | 6-28650 A | 2/1994 |
| JP | 7-85406 | 3/1995 |
| JP | 11-39647 | 2/1999 |
| JP | 11-053735 | 2/1999 |
| JP | 2000-098588 | 4/2000 |
| JP | 2001-110050 | 4/2001 |
| JP | 2001-176049 | 6/2001 |
| JP | 2002-279616 A | 9/2002 |
| JP | 2004-295989 | 10/2004 |
| JP | 2005-050468 | 2/2005 |
| JP | 2005-108335 | 4/2005 |
| JP | 2006-48812 A | 2/2006 |

OTHER PUBLICATIONS

New et al., "Submicron patterning of thin cobalt films for magnetic storage", Journal of Vacuum Science Technology B., vol. 12, No. 6, Nov./Dec. 1994, pp. 3196-3201.

* cited by examiner

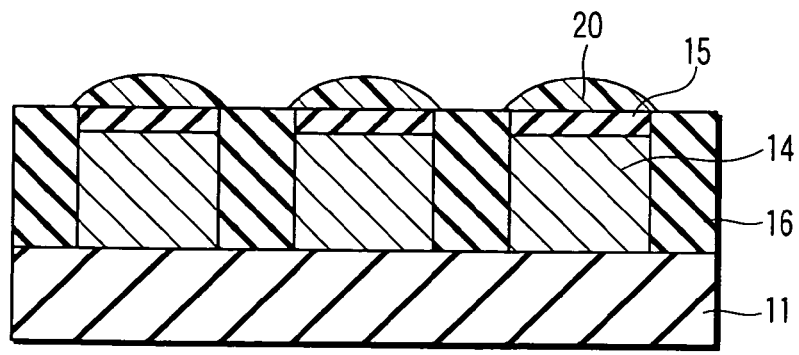
F I G. 2

MAGNETIC RECORDING MEDIUM

CROSS-REFERENCE TO RELATED APPLICATIONS

This application is based upon and claims the benefit of priority from prior Japanese Patent Application No. 2005-142699, filed May 16, 2005, the entire contents of which are incorporated herein by reference.

BACKGROUND OF THE INVENTION

1. Field of the Invention

The present invention relates to magnetic recording media used in a high-density magnetic recording and reproducing apparatus, a method of manufacturing the magnetic recording media, and a magnetic recording apparatus.

2. Description of the Related Art

Magnetic recording apparatuses such as hard disk drives (HDD) are widely used accompanying spread of personal computers. In recent years, the advent of the Internet and DVDs for high-definition image information has rapidly increased the amount of information to be handled, leading to a growing demand for an increased capacity of HDDs. More and more small-sized HDDs are mounted in mobile instruments such as cellular phones, car navigation systems, and MD3 players. More and more expectations are thus placed on an increased recording density. Such a situation is resulted from a significant increase in the recording density of HDDs. The recording density of HDDs is increased by forming smaller magnetic recording marks. Formation of smaller marks requires a smaller write head, a read head that can detect a lower magnetic field, and magnetic recording media to which smaller marks can be stably written.

In order to form smaller marks on magnetic recording media, efforts have hitherto been made to reduce the size of magnetic particles forming a magnetic recording layer deposited by sputtering. However, reduction in the size of magnetic particles has been more and more difficult owing to the degraded thermal stability of fine magnetic particles, that is, a so-called thermal fluctuation problem. In order to solve the thermal fluctuation problem, it is conceivable to improve the thermal stability of a magnetic material itself. This solution instead enhances resistance of the magnetic recording layer to a recording field, thus requiring a high magnetic field in write operation. However, the field intensity achieved by a write head is approaching a limit.

Under the circumstances, a patterned media has been proposed, which has a structure greatly different from that of conventional magnetic recording media. In the patterned media, recording cells serving as minimum recording units are arrayed on recording tracks by lithography. In a conventional magnetic recording layer deposited by sputtering, even a minimum recording mark is formed by writing data to a cluster of several tens to several hundred magnetic particles. On the other hand, the patterned media enables the size of magnetic particles to be increased to that of a recording cell formed by lithography. This makes it possible to fundamentally solve the thermal fluctuation problem, attributed to a reduction in the size of magnetic particles.

However, since the pattered media has finely processed recording cells, when the head collides against the media, the recording cells themselves are likely to be destroyed by the resulting impact or friction. A recording cell consisting of a single magnetic particle has its magnetic characteristics markedly changed even with a fine defect. In the recording density estimated to be realized by the patterned media, spacing between the head and the media will be further reduced. Higher demands are thus expected to be placed on the resistance to the collision or friction.

In order to improve the resistance to the impact or friction between the head and the media, a hard diamond-like carbon film is commonly adopted as a protective film on a recording film (see, for example, Jpn. Pat. Appln. KOKAI No. 2004-295989). However, the surface of a diamond-like carbon film deposited by chemical vapor deposition (CVD) does not easily allow the adhesion of a lubricant. Thus, disadvantageously, the lubricant may fail to adhere to some areas of the diamond-like carbon film, or, at the time of the contact, the lubricant may be released and adhere to the head.

On the other hand, various surface treatments have been proposed which serve as methods for improving the adhesion for the lubricant. However, if the entire surface is improved so as to allow the lubricant to adhere easily, large capillaries are formed when the head comes into contact with the media surface. This increases sticking force for the head to do more serious damage to the media as a result of friction. A tradeoff relationship thus exists between improvement in wettability and reduction in the spacing between the head and the media. Particularly with the patterned media, if the lubricant does not adhere well to the media surface and fails to adhere to any areas, each magnetic particle is seriously damaged. It is thus essential to realize uniform adhesion of the lubricant.

In order to solve this problem, a method has hitherto been proposed which forms recesses and protrusions on the surface of the media. Forming recesses and protrusions on the surface of the media separates minutely each area in which the lubricant is present, thus improving the adhesion of the lubricant. A very small space can also be created between the head and media at the time of contact. This prevents the release of the lubricant at the time of the contact as well as an increase in the magnitude of friction caused by stiction of the head. However, with an increase in recording density, the uneven structure prevents reduction in the spacing between the head and the media.

No techniques are currently known which can solve these problems to improve the durability of the patterned media.

BRIEF SUMMARY OF THE INVENTION

A magnetic recording media according to an aspect of the present invention comprises: recording cells formed of two-dimensionally arrayed magnetic material; a nonmagnetic layer surrounding the recording cells; an adhesive film formed on each of the recording cells; and a lubricant directly adhered to the adhesive film.

A method of manufacturing a magnetic recording media according to another aspect of the present invention, comprises: forming an adhesive material film on a magnetic film; and etching the adhesive material film and the magnetic film under the adhesive material film by lithography to form recording cells and an adhesive film on the recording cells.

A method of manufacturing a magnetic recording media according to still another aspect of the present invention, comprises: forming a carbon film on a magnetic film; etching the carbon film and the magnetic film under the carbon film by lithography to form recording cells and the carbon film on the recording cells; depositing a nonmagnetic layer to fill recesses between the recording cells and to cover the carbon film; etching back the nonmagnetic layer so as to expose the carbon film in an etching gas containing at least one element selected from the group consisting of H, F, N, and O such that the surface of the carbon film is converted into an adhesive film.

A magnetic recording apparatus according to yet another aspect of the present invention comprises the above magnetic recording media and a magnetic head.

BRIEF DESCRIPTION OF THE SEVERAL VIEWS OF THE DRAWING

FIG. 2 is a sectional view of a magnetic recording media (patterned media) according to an embodiment of the present invention;

DETAILED DESCRIPTION OF THE INVENTION

A magnetic recording media according to an embodiment of the present invention is provided with an adhesive film which is formed on each recording cell and to which a lubricant adheres selectively. The lubricant is applied to the adhesive film so as to directly contact with the adhesive film. Thus, even when the head comes into contact with the media, the lubricant adhered to the adhesive film protects the media. The lubricant is two-dimensionally, very uniformly, and finely distributed in association with the recording cells. This prevents large capillaries from being formed even when the head comes into contact with the media. The head in contact with the media can thus be easily released from the media. This prevents the recording cells from being destroyed by the head. Further, since each recording cell is capped by the lubricant, this does not bring about a phenomenon that areas to which the lubricant does not adhere are formed widely, even if the amount of lubricant is reduced. Thus, when the head comes into contact with the media, possible damage to the recording cells caused by impact or friction resulting from the contact can be largely reduced. Since the adhesive film is an area to which the lubricant adheres easily owing to its chemical property, no recesses or protrusions need to be formed on the surface of the media. This makes it possible to prevent disadvantageous increase in the spacing between the head and the media as a result of an uneven structure. Of course, an uneven structure may be used provided that the spacing between the head and media is not significantly increased.

The present invention will be described below in detail with reference to the drawings.

Figure 1A:
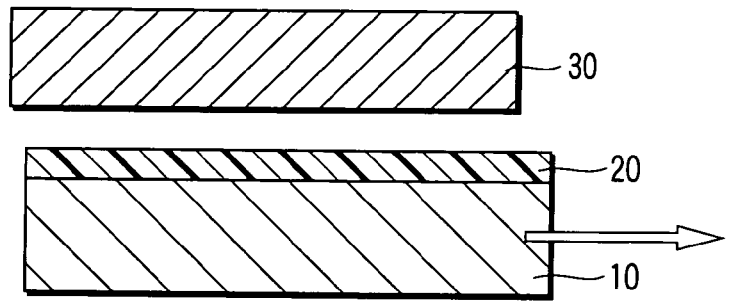
FIGS. 1A, 1B and 1C are diagrams illustrating a problem in a conventional magnetic recording media.
Figure 1B:
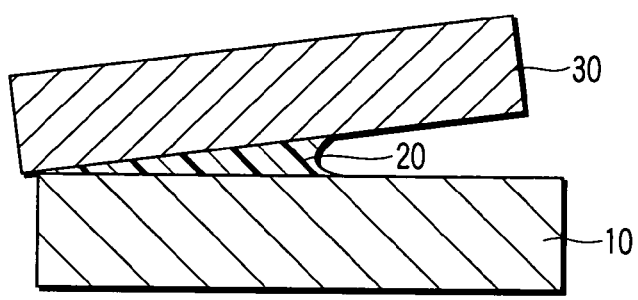
Figure 1C:
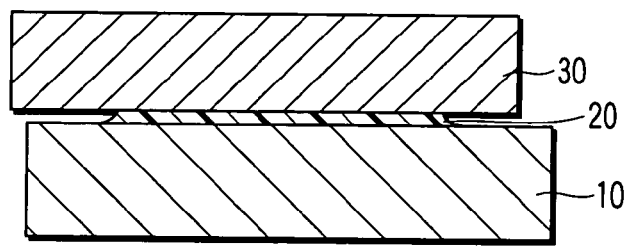

First, a problem with a conventional magnetic recording media will be described with reference to FIGS. 1A, 1B, and 1C. FIG. 1A shows that a lubricant is applied to the surface of conventional magnetic recording media 10, with a head 30 placed above the lubricant 20. As shown in FIG. 1B, when the head 30 comes into contact with the media 10, the lubricant 20 forms a capillary between the head 30 and the media 10. This is expected to increase stiction and friction. The capillary is formed so as to entrain the lubricant 20 over a relatively large area from the area in which the head 30 comes into contact with the media 10. Thus, a large amount of lubricant 20 may be transferred to the head 30 as shown in FIG. 1C.

FIG. 2 shows a sectional view of a magnetic recording media (patterned media) according to an embodiment of the present invention. In FIG. 2, recording cells 14 consisting of two-dimensionally arrayed magnetic dots are formed on a nonmagnetic substrate 11. An adhesive film 15 is formed on the recording cells 14. A nonmagnetic layer 16 is formed so as to surround the recording cells 14. A magnetic recording layer is thus formed on the nonmagnetic substrate 11. Further, the lubricant 20 is applied to the adhesive film 15 so as to directly contact with the adhesive film 15.

Figure 3A:
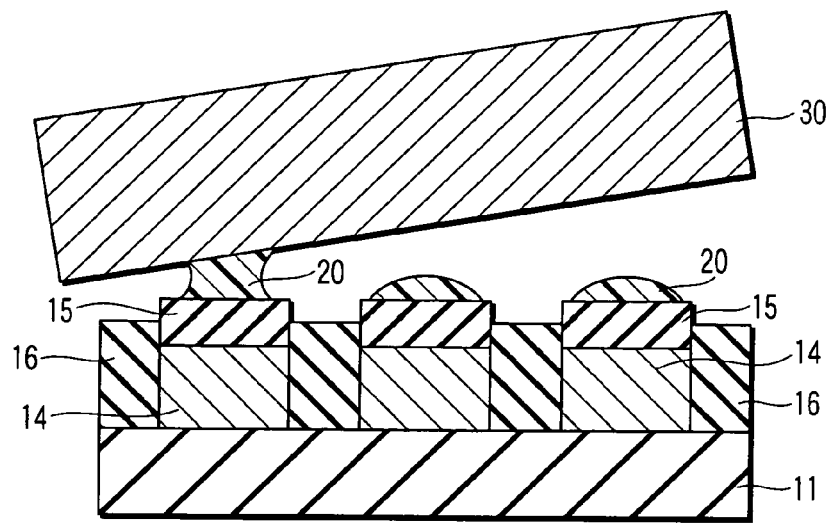
FIGS. 3A, 3B and 3C are diagrams illustrating an effect of the patterned media according to an embodiment of the present invention.
Figure 3B:
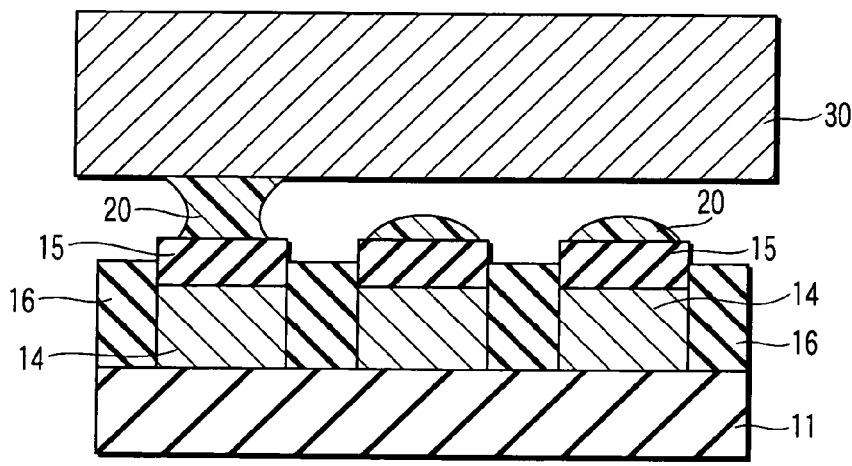
Figure 3C:
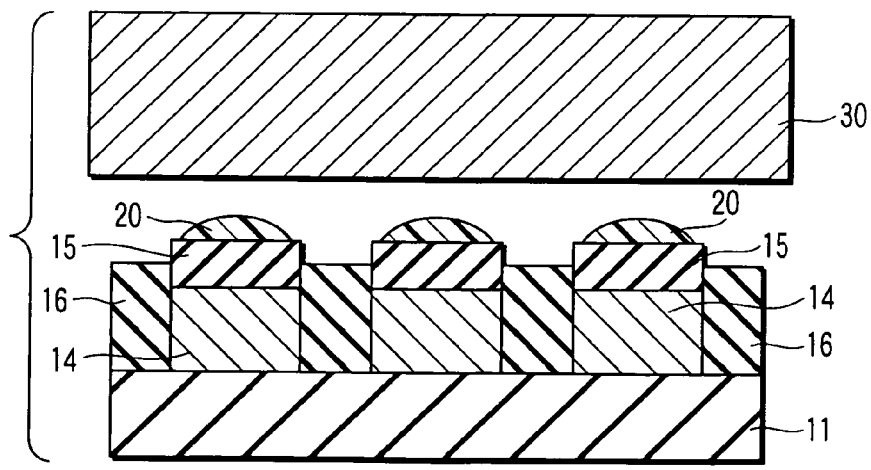

With reference to FIGS. 3A, 3B, and 3C, the effect of the patterned media according to the embodiment of the present invention shown in FIG. 2 will be described.

As shown in FIG. 3A, since the lubricant 20 is localized on the adhesive film 15 on each recording cell 14, only a very small capillary may be formed when the head 30 comes into contact with the media. This prevents the head 30 from adhering to the entire media surface by stiction as shown in FIG. 3B. Further, as shown in FIG. 3C, the head 30 can easily take off the media to continue stable running.

Materials that may be used for the patterned media according to the embodiment of the present invention will be described in detail below.

Examples of the substrate include a glass substrate, a metal substrate, a plastic substrate, and a Si substrate. A metal or dielectric film may be formed on these substrates. The magnetic recording media is generally provided with a plurality of metal or dielectric films serving as an underlayer for the magnetic recording layer, in order to control, for example, crystal orientation of the magnetic recording layer. A perpendicular magnetic recording media is generally provided with a soft underlayer under the magnetic recording layer. The shape of the substrate is not particularly limited, but the substrate may be of a disk shape with a diameter of 0.85, 1, 1.8, 2.5 or 3 inches. Alternatively, the substrate may be formed in a rectangular card or a tape.

The recording cells formed on the substrate comprise a ferromagnetic material. Specifically, the recording cells contain at least one ferromagnetic metal selected from Co, Fe, and Ni. More specifically, the recording cells may contain at least one metal selected from Cr, Pt, Pd, Ta, Tb, Sm, and Gd. The shape of the recording cells is not particularly limited. The shape of the recording cells may include a cylinder, an elliptic cylinder, a square prism, a rectangular prism, a cone, and an elliptic cone each of which may have corners with curvatures. The size of the recording cells is not particularly limited. However, since the magnetic recording media according to an embodiment of the present invention has a higher recording density than the conventional one, the recording cells may preferably be sized in a substrate plane such that an average diameter is 20 nm or less for the cylinder and cone, and average width is 200 nm or less in a major axis direction and is 20 nm or less in a minor axis direction for the square and rectangular prisms and the elliptic cylinder and cones. The interval of the recording cells in the substrate plane is not particularly limited. However, owing to the higher recording density as described above, the recording cells are preferably separated such that the interval between the centers thereof is 50 nm or less for cylinders or cones, and the interval is 300 nm or less in the major axis direction and is 50 nm or less in the minor axis direction for the square or rectangular prisms or elliptic cylinders or cones. It is preferable that a sufficient output can be provided when magnetizations of the recording cells in a desired recording density are read out by a magnetic read. Taking the requirement into consideration, the recording cells preferably have a height of 5 nm or more and 50 nm or less.

The nonmagnetic layer filled to surround the recording cells is not particularly limited provided that it consists of a nonmagnetic material that does not affect the magnetic properties of the recording cells. Examples of the nonmagnetic material include, for example, dielectric materials such as C (carbon), $SiO_2$, SiN, $Al_3O_4$, $TiO_2$, and ZrO, metals such as Si, Ge, Al, Cu, Au, Pt, Pd, Ag, Ti, Ta, and W, semiconductors, and their alloys. A polymer may be used as a nonmagnetic layer. Examples of the polymer include polystyrene, polycarbonate, polyimide, spin-on-glass, a photo-curable resin and a thermosetting resin. The height of the nonmagnetic layer is not particularly limited. However, it is preferable that the recording cells should exhibit high durability and the magnetic head should not be hindered to approach the recording cells during read and write operations due to presence of unevenness. In view of these conditions, the height of the nonmagnetic layer should preferably be within the range of ±5 nm relative to the height of the recording cells.

In the magnetic recording media according to an embodiment of the present invention, the adhesive film is formed on each recording cell. The material of the adhesive film is not particularly limited provided that it has sufficient durability against impact to the recording cells and exhibits high adhesiveness for the lubricant. Such an adhesive film is preferably formed of a carbon film containing at least one element selected from the group consisting of H, F, N, and O. In other words, the preferable adhesive film is formed of a carbon film, which is used as a protective film in current hard disk media, to which at least one element selected from the group consisting of H, F, N, and O is added. The carbon film is preferably diamond-like carbon containing $sp^3$ carbon atoms as a main component but may be graphite-like carbon containing a large number of $sp^2$ carbon atoms. The surface of the graphite-like carbon may be irradiated with ultraviolet rays or chemically modified. The diamond-like carbon itself is poor in adhesiveness for the lubricant but the diamond-like carbon to which at least one element selected from the group consisting of H, F, N, and O is added is improved in adhesiveness for the lubricant.

In the magnetic recording media according to an embodiment of the present invention, the lubricant selectively and directly contacts the surface of the adhesive film to adhere to it. This does not mean that no lubricant adheres to the surface of the nonmagnetic layer. It is only necessary that a larger amount of lubricant adheres to the surface of the adhesive film than to the surface of the nonmagnetic layer. In fact, the nonmagnetic layer cannot be formed so that no lubricant is present on the surface thereof. Further, according to the embodiment, even if the lubricant is removed from the surface of the adhesive film when the head comes into contact with the media, the lubricant adhering to the surface of the nonmagnetic layer is effectively supplied to the surface of the adhesive film. The present invention is effective when the amount of lubricant adhering to the adhesive film is larger than that of lubricant adhering to the nonmagnetic layer by 20% or more.

Now, with reference to FIGS. 4A, 4B, 4C, 4D, and 4E, a first method of manufacturing patterned media according to the embodiment of the present invention will be described.

Figure 4A:
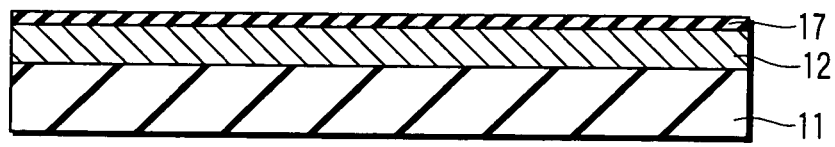
FIGS. 4A, 4B, 4C, 4D and 4E are sectional views showing a first method of manufacturing a patterned media according to an embodiment of the present invention.

As shown in FIG. 4A, a ferromagnetic layer 12 is deposited on the nonmagnetic film 11. A method of depositing the ferromagnetic layer is not particularly limited but it is preferably to use sputtering in view of deposition rate. Then, a film of a material exhibiting high adhesiveness for the lubricant (hereinafter referred to as an adhesive material film) 15 is deposited on the ferromagnetic layer 12. Example of the adhesive material film is a diamond-like carbon film containing at least one element selected from the group consisting of H, F, N, and O as described above. In this case, the adhesive material film 17 can be formed by depositing a diamond-like carbon film by plasma CVD and then leaving the film in plasma of a gas containing at least one element selected from the group consisting of H, F, N, and O. The adhesive material film 17 can also be formed by depositing a diamond-like carbon film in a chamber by plasma CVD while introducing a gas containing at least one element selected from the group consisting of H, F, N, and O into the chamber.

Figure 4B:
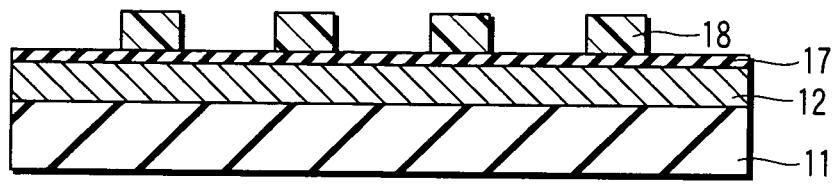

As shown in FIG. 4B, an etching mask 18, for processing the two-dimensionally arrayed recording cells, is formed on the adhesive material film 17. The material of the etching mask 18 is not particularly limited. For example, the etching mask 18 corresponding to a pattern of the recording cells can be formed by applying a resist to the adhesive material film 17 and patterning the resist using an electron-beam lithography apparatus. The etching mask 18 can also be formed by nano-imprinting. Specifically, the etching mask 18 can be formed by pressing a stamper, on which recesses and protrusions are formed in advance by another method, against a plastic film such as a resist applied to the substrate.

Figure 4C:
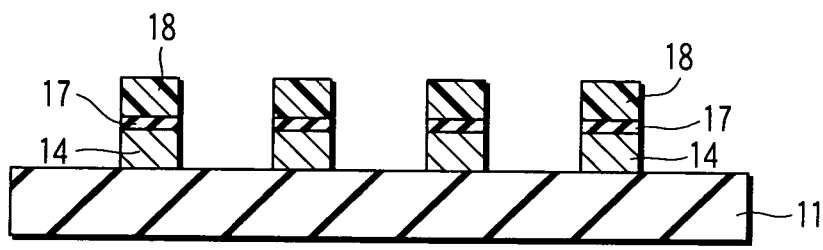

As shown in FIG. 4C, the adhesive material film 17 is etched in areas not covered with the etching mask 18, and further the ferromagnetic layer 12 is etched to form two-dimensionally arrayed recording cells 14 made of magnetic dots. The adhesive material film 17 and the ferromagnetic layer 12 can be etched by a method such as reactive ion etching (RIE) or ion beam etching or by consecutively performing both methods. For example, a method can be adopted in which the adhesive material film 17 is etched by RIE using an oxygen gas and then the ferromagnetic layer 12 is etched by Ar ion beam etching. An adhesive film can be precisely formed on each recording cell 14 by thus consecutively processing the adhesive material film 17 and the ferromagnetic layer 12.

Figure 4D:
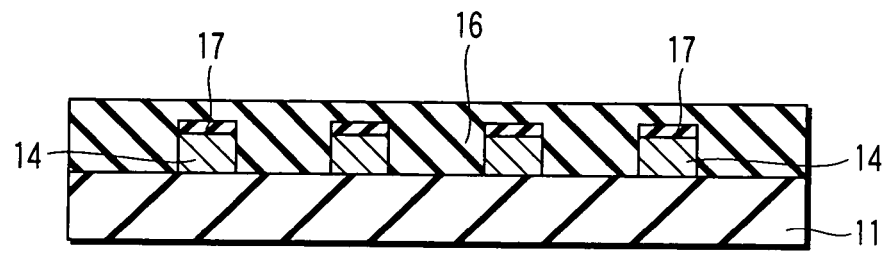

As shown in FIG. 4D, a nonmagnetic layer 16 is deposited on the entire surface of the resulting structure so as to fill the recesses between the recording cells 14. Examples of the material for the nonmagnetic layer 16 include, for example, dielectric materials such as C (carbon), $SiO_2$, SiN, $Al_3O_4$, $TiO_2$ and ZrO, metals such as Si, Ge, Al, Cu, Au, Pt, Pd, Ag, Ti, Ta and W, semiconductors, or their alloys. A method of forming the nonmagnetic layer 16 is not particularly limited and sputtering may be used.

Figure 4E:
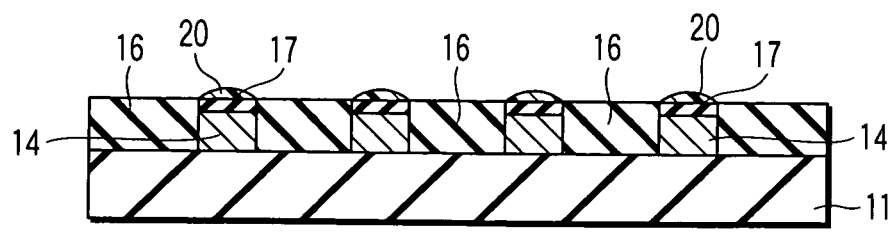

As shown in FIG. 4E, the nonmagnetic layer 16 is etched back so as to expose the adhesive material film 17. In the state that the nonmagnetic layer 16 is as deposited by sputtering, the nonmagnetic layer 16 is formed along the structure of recesses and protrusions of the recording cells 14 and adhesive material film 17 and the surface thereof thus is largely uneven. When the surface of such a nonmagnetic layer 16 is etched back, the nonmagnetic layer 16 retains the shapes of the recesses and protrusions, resulting in insufficient durability to impact. Thus, it is preferable to flatten the surface of the nonmagnetic layer 16 prior to the etch-back step. For example, the surface of the nonmagnetic layer 16 can be flattened by depositing the nonmagnetic layer 16 by sputtering and then performing annealing. The surface of the nonmagnetic layer 16 can also be flattened by depositing the nonmagnetic layer 16 while applying a bias voltage to the substrate to slightly etch back the surface thereof. The surface can also be flattened by depositing the nonmagnetic layer 16 by sputtering and then applying a polymer material to the nonmagnetic layer 16 to fill the recesses. The surface can be further flattened by applying the polymer material to the nonmagnetic layer 16 and then performing annealing. The polymer material enables flattening by annealing at relatively low temperatures. Thus, use of the polymer prevents decrease in throughput compared to the case of flattening the nonmagnetic layer itself by annealing. The etch-back is effectively carried out by ion milling or RIE. Subsequently, the lubricant 20 is applied to the surface so as to be adhered directly to the adhesive material film 17 on each recording cell 14. The lubricant 20 is preferably based on perfluoropolyether. For example, such a product commercially available under a trade name of FOMBLIN or KRYDOX may be used as the lubricant.

The above method enables the lubricant 20 to adhere properly to the adhesive material film 17 on each recording cell 14. This makes it possible to improve the durability of the patterned media.

Now, with reference to FIGS. 5A, 5B, 5C, 5D, and 5E, a second method of manufacturing patterned media according to another embodiment of the present invention will be described.

Figure 5A:
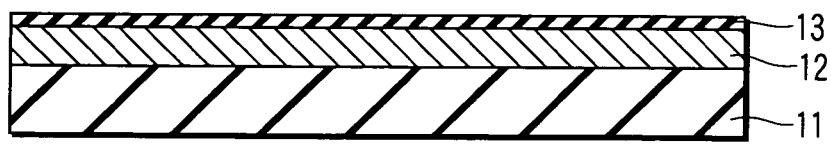
FIGS. 5A, 5B, 5C, 5D and 5E are sectional views showing a second method of manufacturing a patterned media according to another embodiment of the present invention.
Figure 5B:
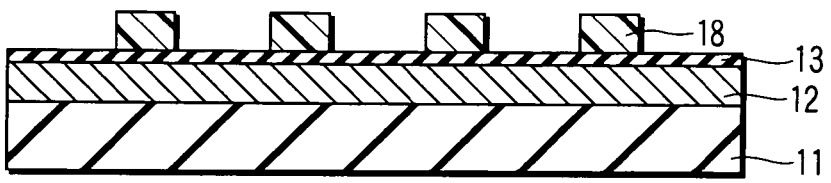
Figure 5C:
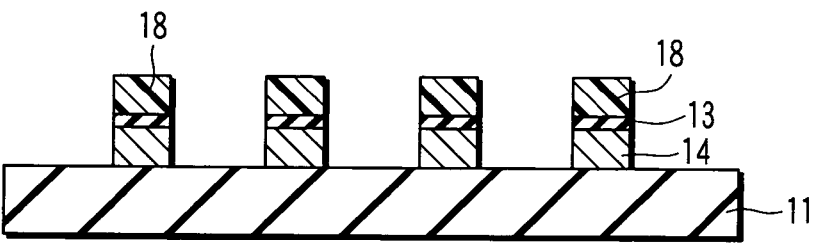
Figure 5D:
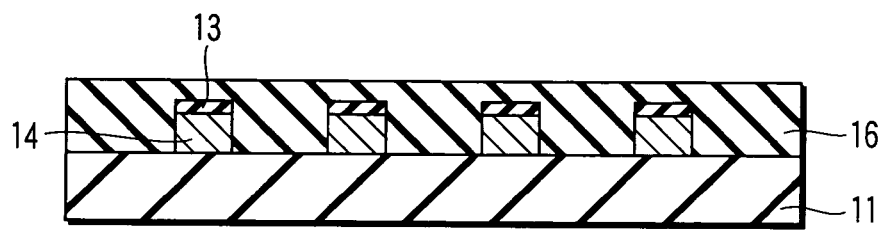

As shown in FIG. 5A, the ferromagnetic layer 12 is deposited on the nonmagnetic film 11, and the diamond-like carbon film 13 is deposited on the ferromagnetic layer 12, as in the case of FIG. 4A. As shown in FIG. 5B, the etching mask 18, for processing the two-dimensionally arrayed recording cells, is formed on the diamond-like carbon film 13, as in the case of FIG. 4B. As shown in FIG. 5C, the diamond-like carbon film 13 is etched in areas not covered with the etching mask 18, and further the ferromagnetic layer 12 is etched to form two-dimensionally arrayed recording cells 14 made of magnetic dots, as in the case of FIG. 4C. The etching method is similar to that described in connection with FIG. 4C. As shown in FIG. 5D, the nonmagnetic layer 16 is deposited on the entire surface of the resulting structure so as to fill the recesses between the recording cells 14, as in the case of FIG. 4D.

Figure 5E:
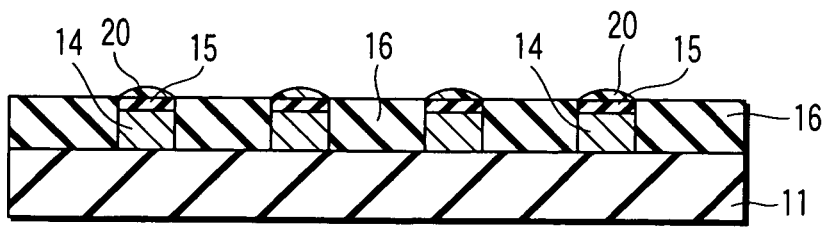

As shown in FIG. 5E, the nonmagnetic layer 16 is etched back. In this case, the etch-back is carried out using an etching gas in which at least one element selected from the group consisting of H, F, N, and O is contained. This enables the exposed surface of the diamond-like carbon film 13 to be converted into the adhesive film 15. With the method shown in FIG. 4, the surface of the adhesive material film 17 may be modified during a step of applying a resist to form an etching mask 18 or during the subsequent steps. In contrast, with the method shown in FIG. 5, when the surface of the diamond-like carbon film 13 is appeared by etch-back, the surface thereof is exposed to plasma containing at least one element selected from the group consisting of H, F, N, and O to be converted into the adhesive film 15. This enables solely the most important surface to be converted into the adhesive film 15. Subsequently, the lubricant 20 is applied to the surface so as to be adhered directly to the adhesive film 15 on each recording cell 14.

EXAMPLES

The present invention will be described below in further detail based on examples.

First Example

In the present example, a patterned media manufactured by using the first method will be described. A CoCrPt film as a ferromagnetic layer was deposited on a glass substrate with a diameter of 2.5 inches to a thickness of 20 nm by sputtering. A diamond-like carbon film was deposited on the CoCrPt film to a thickness of 5 nm by plasma CVD. The surface of the diamond-like carbon film was exposed to $CF_4$ gas plasma so as to be converted into an adhesive material film. On the other hand, a Ni stamper was prepared which had a pattern of cylindrical holes with a diameter of 20 nm and a depth of 40 nm arranged along the circumference at an interval of 40 nm so as to form a square lattice. A novorak-based polymer film was applied to the adhesive material film to a thickness of 50 nm. The Ni stamper was pressed against the novorak-based polymer by nano-imprinting to form an etching mask pattern. The adhesive material film and ferromagnetic layer were etched by argon ion milling so as to form recording cells. Diamond-like carbon as a material for a nonmagnetic layer was deposited to a thickness of 40 nm by plasma CVD so as to fill the recesses between the recording cells. A polystyrene film for flattening the surface was applied to the nonmagnetic layer to a thickness of 50 nm, and then was annealed at 150° C. Etch-back over about 50 nm was performed by argon ion milling to expose the surface of the adhesive material film. A lubricant, Z-dol, was applied to the surface to a thickness of about 0.5 nm by dip coating so as to be directly adhered to the diamond-like carbon film.

Flying tests were conducted on a hard disk drive incorporating the resultant patterned media. It was confirmed that the hard disk drive maintained stable flying even five hours after the test was started.

Second Example

In the present example, a patterned media manufactured by using the second method will be described. A CoCrPt film as a ferromagnetic layer was deposited on a glass substrate with a diameter of 2.5 inches to a thickness of 20 nm by sputtering. A diamond-like carbon film was deposited on the CoCrPt film to a thickness of 5 nm by plasma CVD. A novorak-based polymer film was applied to the diamond-like carbon film to a thickness of 50 nm. A Ni stamper (which had a pattern of cylindrical holes with a diameter of 20 nm and a depth of 40 nm arranged along the circumference at an interval of 40 nm so as to form a square lattice) was pressed against the novorak-based polymer by nano-imprinting to form an etching mask pattern. The diamond-like carbon film and ferromagnetic layer were etched by argon ion milling so as to form recording cells. $SiO_2$ as a material for a nonmagnetic layer was deposited to a thickness of 40 nm by plasma CVD so as to fill the recesses between the recording cells. A polystyrene film for flattening the surface was applied to the nonmagnetic layer to a thickness of 50 nm, and then was annealed at 150° C. Etch-back over about 50 nm was performed by reactive ion etching using a $CF_4$ gas to expose the surface of the diamond-like carbon film, thereby converting the surface thereof into an adhesive film. A lubricant, Z-dol, was applied to the surface to a thickness of about 0.5 nm by dip coating so as to be directly adhered to the adhesive film.

Flying tests were conducted on a hard disk drive incorporating the resultant patterned media. It was confirmed that the hard disk drive maintained stable flying even five hours after the test was started.

Third Example

In the present example, exposure to oxygen gas plasma was used to form an adhesive material film. A CoCrPt film as a ferromagnetic layer was deposited on a glass substrate with a diameter of 2.5 inches to a thickness of 20 nm by sputtering. A diamond-like carbon film was deposited on the CoCrPt film to a thickness of 5 nm by plasma CVD. The surface of the diamond-like carbon film was exposed to oxygen gas plasma so as to be converted into an adhesive material film. Conditions were adjusted so that the diamond-like carbon film was etched during the exposure to the oxygen gas plasma and had a thickness of 5 nm at the end of the exposure. A novorak-based polymer film was applied to the adhesive material film to a thickness of 50 nm. A Ni stamper (which had a pattern of cylindrical holes with a diameter of 20 nm and a depth of 40 nm arranged along the circumference at an interval of 40 nm so as to form a square lattice) was pressed against the novorak-based polymer by nano-imprinting to form an etching mask pattern. The adhesive material film and ferromagnetic layer were etched by argon ion milling so as to form recording cells. Diamond-like carbon as a material for a nonmagnetic layer was deposited to a thickness of 40 nm by plasma CVD so as to fill the recesses between the recording cells. A polystyrene film for flattening the surface was applied to the nonmagnetic layer to a thickness of 50 nm, and then was annealed at 150° C. Etch-back over about 50 nm was performed by argon ion milling to expose the surface of the diamond-like carbon film. A lubricant, Z-dol, was applied to the surface to a thickness of about 0.5 nm by dip coating so as to be directly adhered to the adhesive film.

Flying tests were conducted on a hard disk drive incorporating the resultant patterned media. It was confirmed that the hard disk drive maintained stable flying even five hours after the test was started.

Fourth Example

In the present example, exposure to hydrogen gas plasma was used to form an adhesive material film. A CoCrPt film as a ferromagnetic layer was deposited on a glass substrate with a diameter of 2.5 inches to a thickness of 20 nm by sputtering. A diamond-like carbon film was deposited on the CoCrPt film to a thickness of 5 nm by plasma CVD. The surface of the diamond-like carbon film was exposed to hydrogen gas plasma to be converted into an adhesive material film. A novorak-based polymer film was applied to the adhesive material film to a thickness of 50 nm. A Ni stamper (which had a pattern of cylindrical holes with a diameter of 20 nm and a depth of 40 nm arranged along the circumference at an interval of 40 nm so as to form a square lattice) was pressed against the novorak-based polymer by nano-imprinting to form an etching mask pattern. The adhesive material film and ferromagnetic layer were etched by argon ion milling so as to form recording cells. Diamond-like carbon as a material for a nonmagnetic layer was deposited to a thickness of 40 nm by plasma CVD so as to fill the recesses between the recording cells. A polystyrene film for flattening the surface was applied to the nonmagnetic layer to a thickness of 50 nm, and then was annealed at 150° C. Etch-back over about 50 nm was performed by argon ion milling to expose the surface of the diamond-like carbon film. A lubricant, Z-dol, was applied to the surface to a thickness of about 0.5 nm by dip coating so as to be directly adhered to the adhesive film.

Flying tests were conducted on a hard disk drive incorporating the resultant patterned media. It was confirmed that the hard disk drive maintained stable flying even five hours after the test was started.

Fifth Example

In the present example, exposure to nitrogen gas plasma was used to form an adhesive material film. A CoCrPt film as a ferromagnetic layer was deposited on a glass substrate with a diameter of 2.5 inches to a thickness of 20 nm by sputtering. A diamond-like carbon film was deposited on the CoCrPt film to a thickness of 5 nm by plasma CVD. The surface of the diamond-like carbon film was exposed to nitrogen gas plasma to be converted into an adhesive material film. A novorak-based polymer film was applied to the adhesive material film to a thickness of 50 nm. A Ni stamper (which had a pattern of cylindrical holes with a diameter of 20 nm and a depth of 40 nm arranged along the circumference at an interval of 40 nm so as to form a square lattice) was pressed against the novorak-based polymer by nano-imprinting to form an etching mask pattern. The adhesive material film and ferromagnetic layer were etched by argon ion milling so as to form recording cells. Diamond-like carbon as a material for a nonmagnetic layer was deposited to a thickness of 40 nm by plasma CVD so as to fill the recesses between the recording cells. A polystyrene film for flattening the surface was applied to the nonmagnetic layer to a thickness of 50 nm, and then was annealed at 150° C. Etch-back over about 50 nm was performed by argon ion milling to expose the surface of the diamond-like carbon film. A lubricant, Z-dol, was applied to the surface to a thickness of about 0.5 nm by dip coating so as to be directly adhered to the adhesive film.

Flying tests were conducted on a hard disk drive incorporating the resultant patterned media. It was confirmed that the hard disk drive maintained stable flying even five hours after the test was started.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording medium comprising:
   recording cells formed of two-dimensionally arrayed magnetic material;
   a nonmagnetic layer surrounding the recording cells;
   an adhesive film formed on each of the recording cells; and
   a lubricant directly adhered to the adhesive film and the nonmagnetic layer,
   wherein an amount of the lubricant adhering to the adhesive film on the recording cells is larger than that of the lubricant adhering to the nonmagnetic layer by 20% or more.

2. The magnetic recording medium according to claim 1, wherein the adhesive film is formed of a carbon film containing at least one element selected from the group consisting of H, F, N, and O.

3. The magnetic recording medium according to claim 1, wherein the nonmagnetic layer is formed of carbon or $SiO_2$.

4. A magnetic recording apparatus, comprising the magnetic recording medium according to claim 1, and a magnetic head.

5. The magnetic recording medium according to claim 1, wherein the adhesive film does not cover the nonmagnetic layer.

6. The magnetic recording medium according to claim 2, wherein the adhesive film is formed of a carbon film containing at least one element selected from the group consisting of F, N, and O.

* * * * *